D. G. COPPIN.
Hand-Seeder.

No. 19,833. Patented Apr. 6, 1858.

UNITED STATES PATENT OFFICE.

D. G. COPPIN, OF CINCINNATI, OHIO.

IMPROVEMENT IN HAND CORN-PLANTERS.

Specification forming part of Letters Patent No. 19,833, dated April 6, 1858.

*To all whom it may concern:*

Be it known that I, D. G. COPPIN, of the city of Cincinnati, county of Hamilton, and State of Ohio, have invented a new and useful Improvement in Hand Corn-Planters; and I do hereby declare that the following is a full, clear, and exact description thereof, reference being had to the accompanying drawings, and to the letters of reference marked thereon, and made to form part of this specification.

Similar letters refer to like parts of the improvement.

The nature of my improvement consists in the arrangement of devices employed for making a suitable receptacle in the ground for the corn, so that it can be covered with a proper depth of dirt without pressing the dirt over the grain; also, dropping and scattering the corn as it is discharged from the machine, to prevent it from rotting by lying in a heap and give it a chance for growing properly.

To enable others skilled in the art to make and use the improvement, I will proceed to describe its construction and operation by referring direct to the accompanying drawings, of which—

Figure 2:
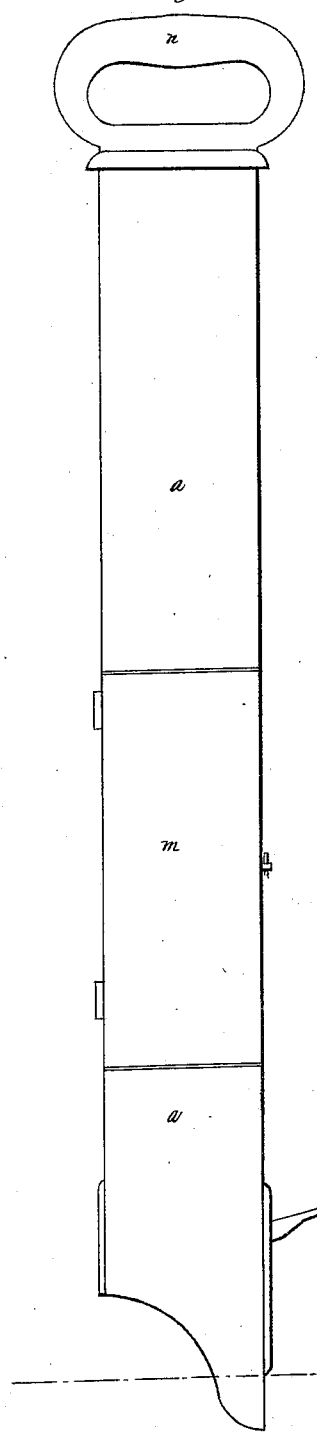
Figure 1:
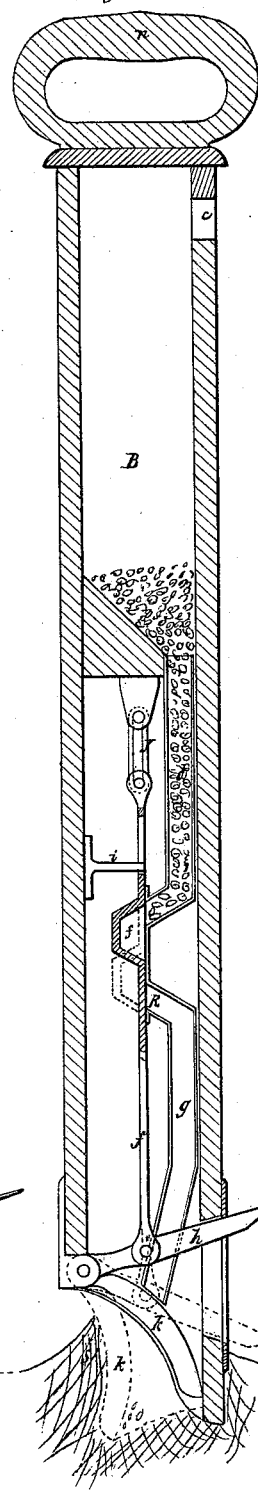

Figure 1 is a longitudinal sectional elevation of the planter. Fig. 2 is a side elevation, and Fig. 3 is a face view, of the portion of the pipes on which the valve works for dropping the corn.

$a\ a$ represent the case of the machine; B, the seed-box, and $c$ an opening into it, through which the seed is placed. $d$ is a tube leading from the seed-box to the valve $f$. To the end of the tube at $o$ the seeds deposit themselves in the valve $f$ through the pipe $d$. From the seed-box the valve is moved then by the lever $h$ and rod $f'$ with the foot on the lever $h$, and thus draws down the valve and seed opposite the opening R in the pipe $g$, and the seed fall then and deposit themselves in the opening made in the ground by the concave plate $k$. The valve is then drawn back again by the rubber spring J over the receiving-opening $o$, which cuts off the communication with the opening R in the discharging-tube $g$. The spring for drawing the valve back is attached to the upper part of the rod $f'$ and lower part of the seed-box, as represented. $i$ is a guide for regulating the motion and properly directing the seed-rod $f''$. The case is furnished with a door, $m$, to open it, for fixing any part of the planter that may be required.

The operation of the planter is as follows: The seed-box is provided with seed, the handle $m$ is taken hold of, and the lower part of the case is forced in the ground to a suitable depth. Then the foot is placed on the lever $h$ and depressed, to which the concave plate $k$ and valve-rod $f'$ are attached, and the movement given to the plate $k$ forces the dirt $s$ out and up, as represented, to make a fit receptacle in the ground for the seed, while the valve $f$ is drawn down and the seed is deposited in the opening R in the pipe $g$, and fall into the ground, as before stated, and when the planter is drawn up the seeds deposit themselves in the lower part of the cavity made in the ground by the plate $k$, and the bank of earth $s$, that has been forced out and up by the plate $k$, will fall over and properly cover the seed the required depth without packing or forcing the dirt on the seed, which is a fault that most all hand corn-planters possess. The discharging-tube $g$ is bent to one side for discharging the corn against the inside of the concave plate $k$ as it is discharged from the tube for the purpose of scattering it in the ground as it strikes the plate, for reasons before mentioned in the foregoing specification.

What I claim as my improvement, and desire to secure by Letters Patent, is—

The combined arrangement of the concave plate $k$, lever $h$, and seed-rod $f'$, arranged with the pipes $d$ and $g$ and spring J, all constructed and operating as represented, for the purposes mentioned in the foregoing specification.

DANIEL G. COPPIN.

Witnesses:
CHARLES H. FOX,
M. BENSON.